(12) United States Patent
Gordin

(10) Patent No.: US 8,946,991 B2
(45) Date of Patent: Feb. 3, 2015

(54) APPARATUS, METHOD, AND SYSTEM FOR EVENT AND BACKUP LIGHTING

(75) Inventor: Myron Gordin, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 624 days.

(21) Appl. No.: 13/330,799

(22) Filed: Dec. 20, 2011

(65) Prior Publication Data

US 2012/0153828 A1 Jun. 21, 2012
US 2014/0292197 A2 Oct. 2, 2014

Related U.S. Application Data

(60) Provisional application No. 61/425,139, filed on Dec. 20, 2010.

(51) Int. Cl.
*H05B 37/02* (2006.01)
*H05B 33/08* (2006.01)
*H02J 9/06* (2006.01)

(52) U.S. Cl.
CPC ............ *H05B 33/0845* (2013.01); *H02J 9/065* (2013.01)
USPC .......................................................... 315/86

(58) Field of Classification Search
CPC ............ H05B 37/02; H05B 41/04; F02P 3/04
USPC ......... 315/291, 307, 222, 224, 246, 247, 297, 315/308, 86
See application file for complete search history.

(56) References Cited

U.S. PATENT DOCUMENTS

| 6,681,110 | B1 | 1/2004 | Crookham et al. |
| 7,778,635 | B2 | 8/2010 | Crookham et al. |
| 2010/0020527 | A1 | 1/2010 | Fiermuga |
| 2010/0301668 | A1* | 12/2010 | Yakes et al. ............ 307/9.1 |

FOREIGN PATENT DOCUMENTS

| JP | 2003-031381 A | 1/2003 |
| JP | 2006-012638 A | 1/2006 |
| JP | 2006-014513 A | 1/2006 |
| KR | 10-2005-0119931 A | 12/2005 |
| WO | WO 2012/088018 A2 | 6/2012 |

OTHER PUBLICATIONS

Tripp Lite Power Protection—Tripp Lite Model PV150—PowerVerter 150W Ultra-Compact Inverter with 1 AC Outlet, retrieved from the Internet on Dec. 17, 2011 from http://www.tripplite.com/en/products/model-detail.cfm?ModelID=2553 (3 pages).
Tyco electronics catalog excerpt—KRPA, KRP, KA, KR series—5 to 10 Amp General Purpose Relay, Sep. 2003, pp. 737-741 (5 pages).

(Continued)

*Primary Examiner* — Minh D A
(74) *Attorney, Agent, or Firm* — McKee, Voorhees & Sease

(57) ABSTRACT

An apparatus, system, and method for solid state lighting is envisioned which, according to aspects of the invention, provides primary event and/or utility lighting during normal power conditions, and which, during periods of interrupted power, provides uninterrupted event lighting for a desired duration, provides a gradual transition from event lighting levels to utility lighting levels, and provides a gradual transition from utility lighting levels to emergency lighting levels.

17 Claims, 9 Drawing Sheets

(56) References Cited

OTHER PUBLICATIONS

Controlled Power Company—1.5 kW—14kW Single Phase—UltraLite Model Elu—Centralized Emergency Lighting Inverters, Feb. 2008, pp. 1-8 (8 pages).
JP 2003-031381—Matsushita Electric Works, Ltd.—English Abstract.
JP 2006-012638—Matsushita Electric Works, Ltd.—English Abstract.
JP 2006-014513—Matsushita Electric Works, Ltd.—English Abstract.
Musco Corporation et al., PCT/US2011/065991 filed Dec. 20, 2011, "International Search Report" mailed Sep. 10, 2012.
Musco Corporation et al., PCT/US2011/065991 filed Dec. 20, 2011, "Written Opinion of the International Searching Authority" mailed Sep. 10, 2012.

* cited by examiner

APPARATUS, METHOD, AND SYSTEM FOR EVENT AND BACKUP LIGHTING

I. CROSS-REFERENCE TO RELATED APPLICATIONS

This application claims priority under 35 U.S.C. §119 of a provisional application Ser. No. 61/425,139 filed Dec. 20, 2010, and which application is hereby incorporated by reference in its entirety.

II. BACKGROUND OF INVENTION

The present invention generally relates to the field of large area lighting, such as lighting for sports events. More specifically, the present invention relates to the response of lighting systems to power outages which could occur at sports events or other public gatherings.

Lighting Needs for Sports Venues

Sports venues and other large areas requiring lighting usually require varying levels of lighting for use at different times. The most light is required during active use of the facility for sports or activities. Less light may be required before the event when people are arriving and after the event when people are still present. A much lower level of light is required for emergency exit during power outages, and possibly for maintenance and security purposes when the venue is not occupied by large numbers of people.

The above three types of lighting that might be used at sports venues will be considered herein under the following definitions: "Event lighting" is lighting provided primarily on and near the sports field, track, etc. for the benefit of the participants, to allow the spectators to see clearly, for television lighting, etc. "Utility lighting" is lighting that is provided for spectators to be able to see and move about within the location, exit the stands, etc. It may be provided in part by "event lighting" and may be provided in part by separate fixtures or lighting systems. "Emergency lighting" is any lights or system of lighting that provides a minimum level of lighting to the location to allow safe exit of the location, or which may be useful for maintenance, security, or continued emergency use.

Adequate "event lighting" for participants in sports events is necessary to allow safe and effective conduct of a sport or activity. For instance, it is well known that the ability to perceive moving objects is related to several factors, including velocity, size, contrast, and color. If an object is moving very fast, is relatively small, is of low contrast with its surroundings or is a color similar to its background, it can be difficult to perceive. Because of this, sports such as baseball and automobile racing rely on a high level of event lighting to provide adequate lighting. Other sports or activities can also require a high level of event lighting.

"Utility lighting" for spectator safety and convenience is related to event lighting. A relatively low level of utility lighting in comparison to the required event lighting can be (by itself) adequate, since movement within the facility does not require the same degree of visual acuity, particularly since spectators do not normally have direct interaction with high speed activities such as throwing, batting, competitive driving, etc. However, when high levels of event lighting are present, the eye can be accustomed to the relatively high level of utility lighting. If the event lighting level is suddenly and dramatically reduced, spectators will be left without the ability of move easily within the facility until their eyes readjust to the diminished light level, and will typically experience some degree of unease with their surroundings due to the sudden and drastic change.

"Emergency lighting" for a typical sports venue is typically considered to be sufficient lighting to proceed safely to exits but is not considered adequate as utility lighting. Public facilities which use artificial lighting are normally required to provide emergency light at an illumination level and for a duration which is adequate for evacuation of the facility. A typical required duration is 90 minutes. However, the safe evacuation of a facility is not the only foreseeable use of emergency backup lighting. In the event of various types of disruptions or disasters, a venue such as a sports stadium might be used for emergency shelter, storage, emergency operations staging, etc. Thus the ability to provide extended lighting, even at a very low level, could be beneficial.

For sports venues, in the event of a power interruption, "required" emergency lighting may not be satisfactory or ideal, since emergency lighting levels do not provide adequate event or utility lighting. Many sports venues could benefit from having a system that provides substantially the same light level in the event of a power failure to help reduce the risk of low visibility of high-speed objects, or for aesthetic, convenience, or other reasons. For example, baseballs can be thrown or batted at a very high velocity—on the order of 100 feet per second or more. Loss of light, even for a very short time, would make it difficult to follow the movement of a ball in the air, which could result in a player or spectator being hit by the ball. Similarly, race cars travel at a very high rate of speed. If lighting were to be interrupted or be significantly diminished during an automobile race, drivers could lose control of their vehicles.

Types of Backup Systems

There are various existing types of backup systems. The Uninterruptible Power Supply (UPS) type of backup system (sometimes known as a "double conversion" or "online" system) provides instant full power to a lighting system in the event of a power interruption. It takes AC grid power and converts it to DC power. The DC power is used to charge storage batteries. The same DC power is fed to an inverter which converts DC to AC power to power a lighting system. In the even of power interruption, DC power from the storage batteries flows without interruption to the DC-to-AC inverter, which is able to maintain full AC voltage output to the lighting system without any loss of voltage or interruption or modification of the AC sine wave output. Considerations for use of this type of system include the fact that by itself, it maintains the same event lighting for a specified period, typically 90 minutes. This may completely exhaust the batteries, making it impossible to provide any extended lighting period. Since the very high levels of event lighting are only needed for a short time in order to complete potentially risky activities, this may not be an efficient use of limited backup power. Reducing lighting levels in order to increase duration of emergency lighting would require additional controls or manual switching of lights by knowledgeable personnel. Or, multiple backup systems would be required to provide power to different lighting systems having different output levels. No provision for adjustment of light levels is provided with a typical UPS type system. A complete backup system using a UPS type system may therefore be too expensive or complicated, or may not provide sufficient duration of backup, extreme low level lighting, or other desired benefits.

An "emergency light" type backup system typically provides low level illumination at a minimum level and duration required for evacuation of a venue. The lighting fixtures are provided for walking paths and exits, and do not provide the ability to complete or safely stop potentially risky sports activities.

Variations or combinations of these systems may be installed, which increases the cost and complexity of the backup system. A UPS system could be installed which allows event lighting to be continued for a given duration, while an emergency system provides extended lighting at a lower level. Still, gradual dimming would be difficult or impossible without extensive additional equipment and cost.

Desired Lighting Solutions for Sports Venues

It would therefore be desirable for sports venues, in the event of power interruption, to provide a high level of event and utility lighting, as well as emergency lighting that is at or above the minimum required level. It would be beneficial for these lighting levels to be provided for a longer duration and/or at a lower cost than is commonly obtained.

Specifically, there is a need for backup event lighting using existing lighting fixtures which in the event of a power failure provides uninterrupted event lighting that is of functionally identical intensity and quality to the primary lighting, for a duration sufficient to safely complete or terminate potentially risky activities. For a baseball game, this could allow the thrown or batted ball to be safely stopped, possibly for the play to be completed, helping to reduce the chance of players getting hit by an airborne baseball or a substantial disruption of the game or activity for a relatively short duration. Or for an automobile race, this would allow vehicles to slow down safely under a caution flag. Further, there is a need for the ability to provide a gradual transition from event lighting levels to lower levels, thereby allowing sufficient time for eye adjustment to lower lighting levels and reducing potential panic or discomfort which might arise due to sudden reduction in lighting levels.

Likewise, there is need for backup utility lighting, using existing event or utility lighting fixtures, that exceeds minimum standards for emergency lighting and that provides benefits in terms of duration and quality in comparison to existing standards for emergency lighting. This would lead to less inconvenience and less spectator discomfort or dissatisfaction. Further, there is a need for the ability to provide a gradual transition from utility lighting levels to lower emergency lighting levels, thereby allowing sufficient time for eye adjustment to lower lighting levels and reducing potential panic or discomfort which might arise due to sudden reduction in lighting levels.

Likewise, there is need for emergency lighting using existing event or utility lighting fixtures that exceeds minimum standards for emergency lighting and that provides benefits in terms of duration and quality in comparison to existing standards for emergency lighting. Further, there is a need for the ability to provide a gradual transition from emergency lighting levels to lower lighting levels which might still be useful in the event of extended power interruption, thereby allowing sufficient time for eye adjustment to even lower lighting levels and reducing potential panic or discomfort which might arise due to sudden reduction in lighting levels or complete loss of lighting. Thus the ability to provide lower light levels down to 10%, or even as small as on the order of 2% or less of original event or utility lighting levels could be beneficial and desirable.

Thus, improvements in the art are desirable.

III. SUMMARY OF THE INVENTION

It is therefore a principle object, feature, advantage, or aspect of the present invention to improve over the state of the art or address problems, issues, or deficiencies in the art.

An apparatus, system, and method for solid state lighting is envisioned which, according to aspects of the invention, provides primary event and/or utility lighting during normal power conditions, and which, during periods of interrupted power, provides uninterrupted event lighting for a desired duration, provides a gradual transition from event lighting levels to utility lighting levels, and provides a gradual transition from utility lighting levels to emergency lighting levels.

Further, an apparatus, system, and method is envisioned according to aspects of the invention which provides a gradual transition from emergency lighting levels to lower lighting levels which may be very low, and which may be shut down according to a schedule or timeline, or which may remain illuminated as long as even minimal backup power is available.

Further, an apparatus, system, and method for solid state lighting is envisioned which according to aspects of the invention may work in tandem with a separate emergency type backup lighting system in order to maximize the quality and duration of backup lighting, and which may provide low level lighting for emergency or other use which may be unrelated to sports event lighting.

Further, an apparatus, system, and method for solid state lighting is envisioned which according to aspects of the invention may work with existing lighting control and reporting systems that may be on or off-site, to provide information about the state of the lighting system or to allow remote control of the lighting system.

IV. BRIEF SUMMARY OF THE DRAWINGS

V. DETAILED DESCRIPTION OF EXEMPLARY EMBODIMENTS

A. Figures

Figure 1:
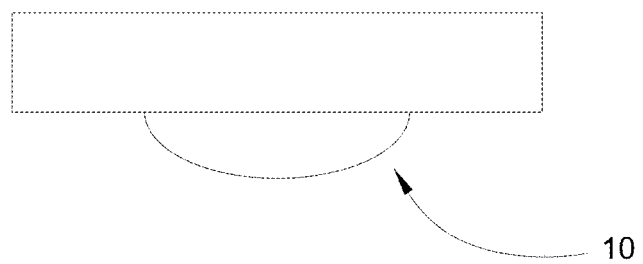
FIG. 1 shows an enlarged scale schematic representation of a typical LED light that could be used in embodiments of the invention.

From time to time in this description, reference will be made to appended figures. Reference numbers or letters will be used to indicate certain parts or locations in the figures. The same reference numbers or letters will indicate the same or similar parts or locations throughout the figures unless otherwise indicated.

B. Overview

An apparatus, system, and method for solid state lighting is envisioned which according to aspects of the invention provides primary event and/or utility lighting during normal power conditions, and which, during periods of interrupted power or under other desired circumstances, using existing event or utility lighting fixtures and/or newly provided lighting fixtures, provides one or more of the following:

a. provides uninterrupted event lighting that is or is substantially of functionally identical intensity and quality to the primary lighting for a duration sufficient to safely complete or terminate hazardous activities;

b. provides a gradual transition from event lighting levels to utility lighting levels;

c. provides uninterrupted utility lighting, that exceeds minimum standards for emergency lighting and that provides benefits in terms of duration or quality in comparison to existing standards for emergency lighting;

d. provides a gradual transition from utility lighting levels to lower emergency lighting levels, thereby allowing sufficient time for eye adjustment to lower lighting levels;

e. provides uninterrupted emergency lighting using existing event or utility lighting fixtures that exceeds minimum standards for emergency lighting and that provides extended duration and/or enhanced quality in comparison to existing standards for emergency lighting;

f. provides a gradual transition from emergency lighting levels to lower lighting levels which might still be useful in the event of extended power interruption, thereby allowing sufficient time for eye adjustment to even lower lighting;

g. provides lower light levels even as small as on the order of 2% or less of original event or utility lighting levels for an extended duration;

h. provides one or more shutdown options, which may include allowing lighting to continue at reduced levels as long as sustainable from the backup power supply;

i. provides a warning signal such as flashing the lights for a short period of time indicating a change in lighting mode (e.g. changing from event lighting to utility lighting or from utility lighting to emergency lighting).

An apparatus, system, and method for solid state lighting is envisioned which according to aspects of the invention may work in tandem with a separate emergency type backup lighting system in order to maximize the quality and duration of backup lighting without requiring long duration use of full power backup event lighting.

An apparatus, system, and method for solid state lighting is envisioned which according to aspects of the invention may provide low level lighting for emergency or other use which may be unrelated to sports event lighting.

An apparatus, system, and method for solid state lighting is envisioned which according to aspects of the invention may work with existing lighting control and reporting systems that may be on or off-site, to provide information about the state of the lighting system or to allow remote control of the lighting system.

The embodiments according to aspects of the invention present some differences from existing systems. For example, existing systems typically do not allow using the same light fixtures for both event lighting, utility lighting, and emergency lighting. Thus for existing systems, if a power backup system is applied only to emergency lighting components, high speed activities may become risky in the event of a power interruption. On the other hand, if a power backup system is applied to event lighting, either available duration of backup lighting is much shorter, or energy storage required is much greater. Thus for any given storage capacity, the envisioned embodiments may provide much greater duration backup lighting.

Some benefits of the embodiments include:

a. providing uninterrupted event light in the event of power interruption thereby reducing the risk of injury from a ball in the air, cars traveling at high speed, etc.

b. providing utility lighting for an extended time period, allowing greater spectator comfort and confidence than provided by much dimmer emergency lighting.

c. providing emergency lighting at a higher intensity for an extended time period, allowing greater safety and usability of a location under extended adverse circumstances.

d. providing gradual dimming between lighting levels, thereby reducing the level of discomfort or anxiety due to sudden lighting changes, and reducing effects of temporary visual impairment due to the time required for the eye to adapt to lower light levels.

e. allowing reporting and offsite control of the lighting system.

Some additional benefits of the preceding embodiments include:

a. doesn't require a full UPS system.

b. can be integrated with a driver system.

c. is not limited to a typical emergency lighting configuration.

d. provides a high range of difference between brightest event lighting and dimmest functional emergency lighting, allowing management of backup power according to circumstances. This means that normal event lighting, backup event lighting, backup utility lighting, emergency lighting, and long duration emergency lighting may be provided from the same lighting fixtures.

e. allows dimming with existing drivers or solid state switching without requiring emergency backup systems separate from event or utility lighting systems.

C. First Exemplary Embodiment: Lighting System with Self-Contained Backup System An apparatus, system, and method for solid state lighting is envisioned which according to aspects of the invention provides primary event and/or utility lighting for sports or other large area lighting needs during normal power conditions, and which, during periods of interrupted power or under other desired circumstances, using existing event or utility lighting fixtures, provides functionally uninterrupted event lighting, which is transitioned to successively lower levels.

Functionally, the lighting system would operated at a given power level for normal event lighting using grid power. In the event of power interruption, "backup event lighting" would be maintained without interruption at or substantially at the original level and quality for a pre-determined time period. The pre-determined time could be on the order of 10 seconds to 1 minute, or much longer. Power would be supplied by batteries, 'long life batteries, capacitors, super-capacitors, or other source of emergency power.

After a specified period of time, the light levels would be lowered over a period of some seconds or minutes to a predetermined level. Lighting level could be lowered gradually or step-wise over a successive period of minutes or hours as appropriate in order to maximize visibility and lighting utility while considering possible future lighting needs.

Reduction of lighting level could also be accomplished by selectively turning off individual LEDs or some portion of lighting fixture LED arrays, using addressable solid state switching within power drivers or distribution systems or using conventional switching methods.

Figure 2:
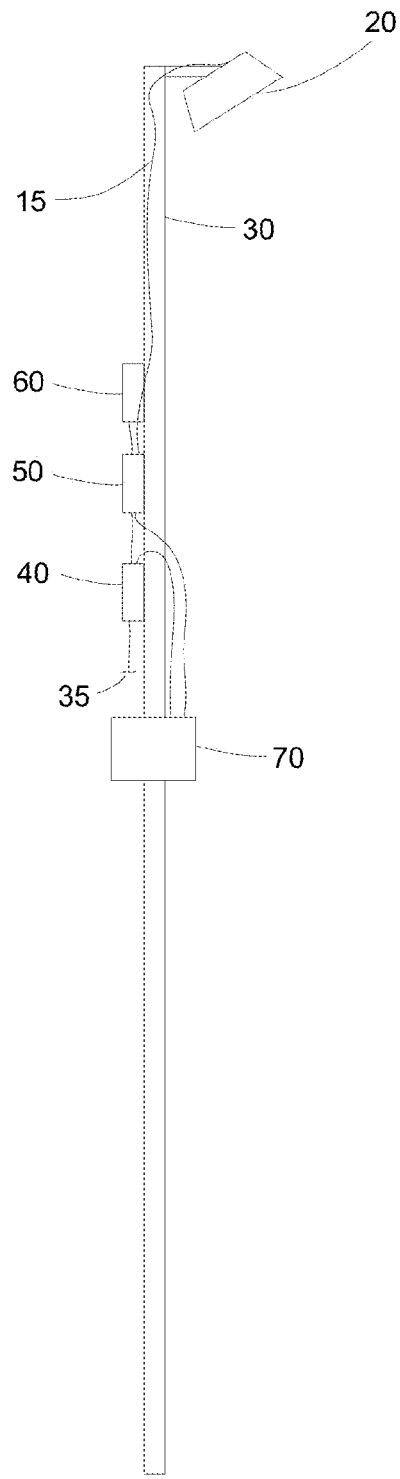
FIGS. 2-3 show a greatly reduced-in-scale elevation of a typical LED lighting installation according to aspects of the invention.

FIGS. 1-2 illustrate the apparatus according the first exemplary embodiment. One or more LED lights 10, FIG. 1, are typically mounted as part of an array 20, FIG. 2 on a pole 30 or other structure, as part of a system of lighting for a sports venue or other location. Power is input (at e.g. 35) from AC (grid) power. Transformer/rectifier 40 converts AC to DC current at voltages suitable to supply driver 50 and battery 70. In the event of a power interruption, battery 70 supplies DC power to driver 50. (As embodied, these components may be supplied as separate components and connected by appropriate wiring 15, or combined in some fashion, or may be included within one common case or even on one common board such as controller 60.) One example of a controller is a programmable microprocessor.

The output from driver 50 to the lighting array 20 is typically a 'current source' type, which provides a specified current through one or more LEDs in a string. It can also use synchronous or asynchronous pulse modulation, linear dimming, or other means which are well known in the art to control power supplied to LEDs. The controller 60 is programmed to control these functions.

Figure 4:
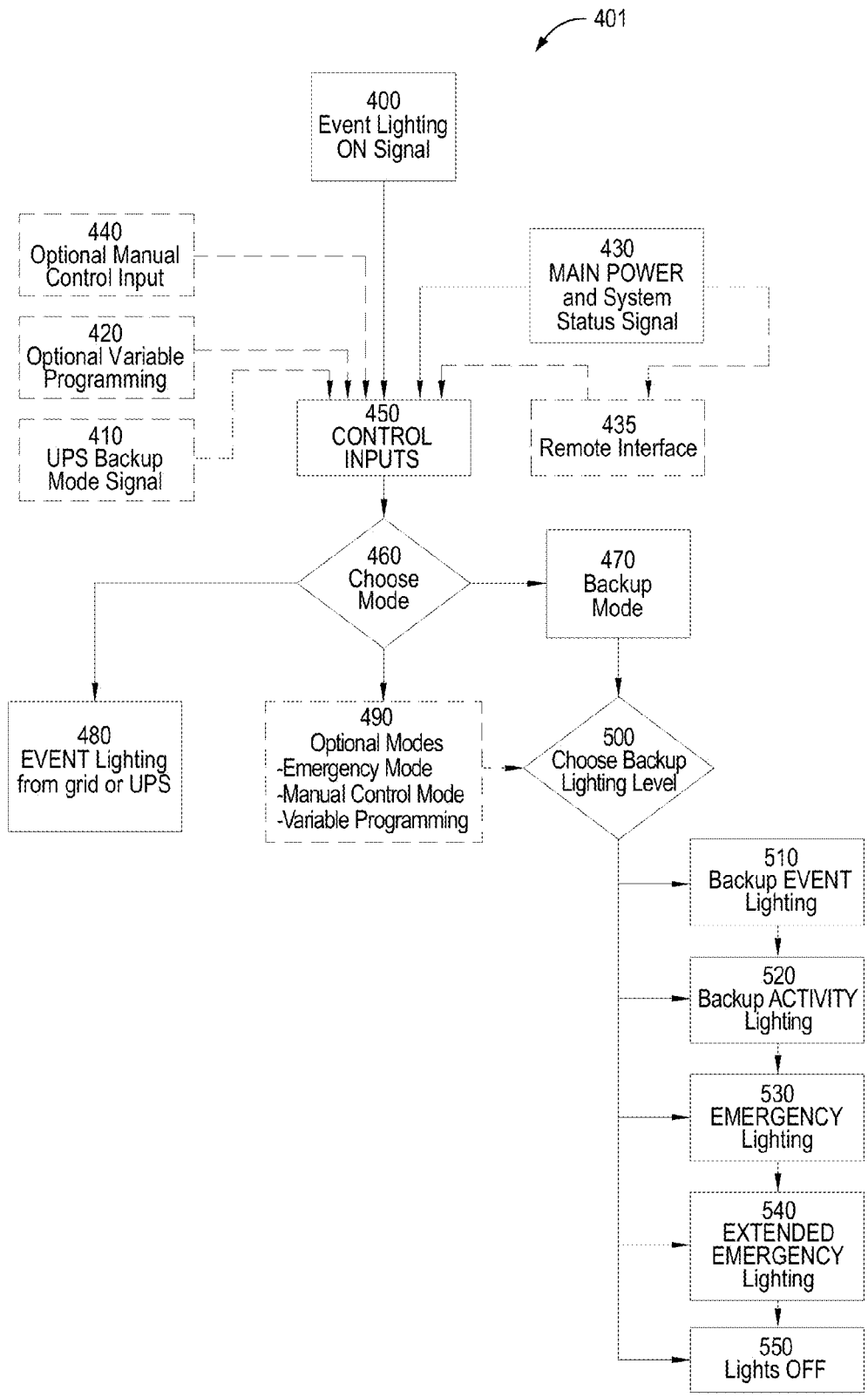
FIG. 4 illustrates logical operation of an embodiment according to aspects of the invention.

Block diagram 401 in FIG. 4 illustrates logical operation of the envisioned first embodiment. Event lighting ON signal 400 from e.g. a manual operator, automatic controller, etc., and other control inputs such as optional remote interface input 435, optional manual control input 440, optional variable programming 420, UPS back-up mode signaling 410 and Main Power and System Status signals 430, are collected at Control Inputs node 450. Main Power and System Status signal 430 is also optionally provided to Remote Interface 435. Based on control inputs 450, the system selects lighting mode (see node 460); either normal event lighting 480, backup mode 470, or optional modes 490. Optional modes could include operating the lights at a low level lighting for extended duration such as for emergency lighting purposes unrelated to event lighting, or tying the operational control back to a central or a local control and monitoring system. Another optional mode would be manual control of lighting level as desired. Another optional mode would be remote control of lighting level as desired. Many other optional modes could be designed and selected. When backup mode 470 is selected, the appropriate backup mode is selected at node 500. Normally, backup event lighting 510 would continue for a predetermined time, on the order of 10 seconds to 1 minute. Lights would then dim to backup activity lighting level 520 for a longer period of time, on the order of 15 minutes to 2 hours. Lights would be further dimmed to emergency lighting level 530 for a longer period which could be on the order of several hours. Finally, lights could be dimmed to extended emergency lighting level 540 which could be on the order of several hours to one or more days. The extended emergency lighting level could be on the order of 10% down to 2% or less of primary event or utility lighting levels. Finally, lights could be turned OFF 550, either because of complete discharge of power storage, ineffectiveness of lighting below a certain level, or because there was no further need for lighting.

The power storage medium could be commercially-available batteries, capacitors, or other technology capable of providing DC or AC current. Batteries would normally provide the longest backup time. Capacitors would generally provide much shorter backup time, but might have much lower needs and costs for maintenance, and might not have the same shelf life issue as batteries.

As an example, assume an operational program that causes the lights to operate for 10 seconds on full brightness, with a ramp-down to 10% brightness within two minutes, and an additional period of operation at 10% brightness for total of two hours. Power required from a battery backup system may be roughly calculated by multiplying the power usage per second times the number of seconds, then converting to watt hours divided by battery voltage to give amp hours required from a backup battery system. Therefore power required for a single fixture having 50 LEDs operating at 1 watt each would be For the initial period: 50 watts×10 seconds=500 watt seconds.

For the ramp down period the average usage for two minutes={[50 watts−(50 watts×10%)]/2×120 seconds+[50 watts×10%×120 seconds]}=[2700 watt seconds+600 watt seconds]=3300 watt-seconds.

For the two hour period, [50 watts×10%×3600 seconds/hour×(2 hours−2 minutes and 10 seconds)]=35350 watt seconds.

For the total time period, 500+3300+35350 watt seconds=39,150 watt seconds.

The total power required for a two hour, two minute, and 10 second emergency operation is 39,800 watt seconds. At 3600 watt seconds per watt hour, this is just under 11 watt hours. Rounding up to 12 watt hours to allow for some system inefficiency, and dividing by 12 volts available from a typical storage battery, this is 1 ampere-hour. In comparison, a typical marine/RV deep cycle battery such as the Stowaway Battery ST27DC180, available commercially (e.g. from retail stores operated by Tractor Supply Company, 200 Powell Place, Brentwood, Tenn. 37027) is rated at 105 ampere hours. This means that a single 12 volt deep cycle battery could supply 100 such fixtures for a two hour emergency operation. Additionally, at 10% power, the fixture would require 5 watt hours, which from a 12 volt battery equates to 0.417 ampere hours, or about ½ ampere hour per hour of operation. This would allow over 200 hours of operation of the single fixture from that same battery.

Figure 5:
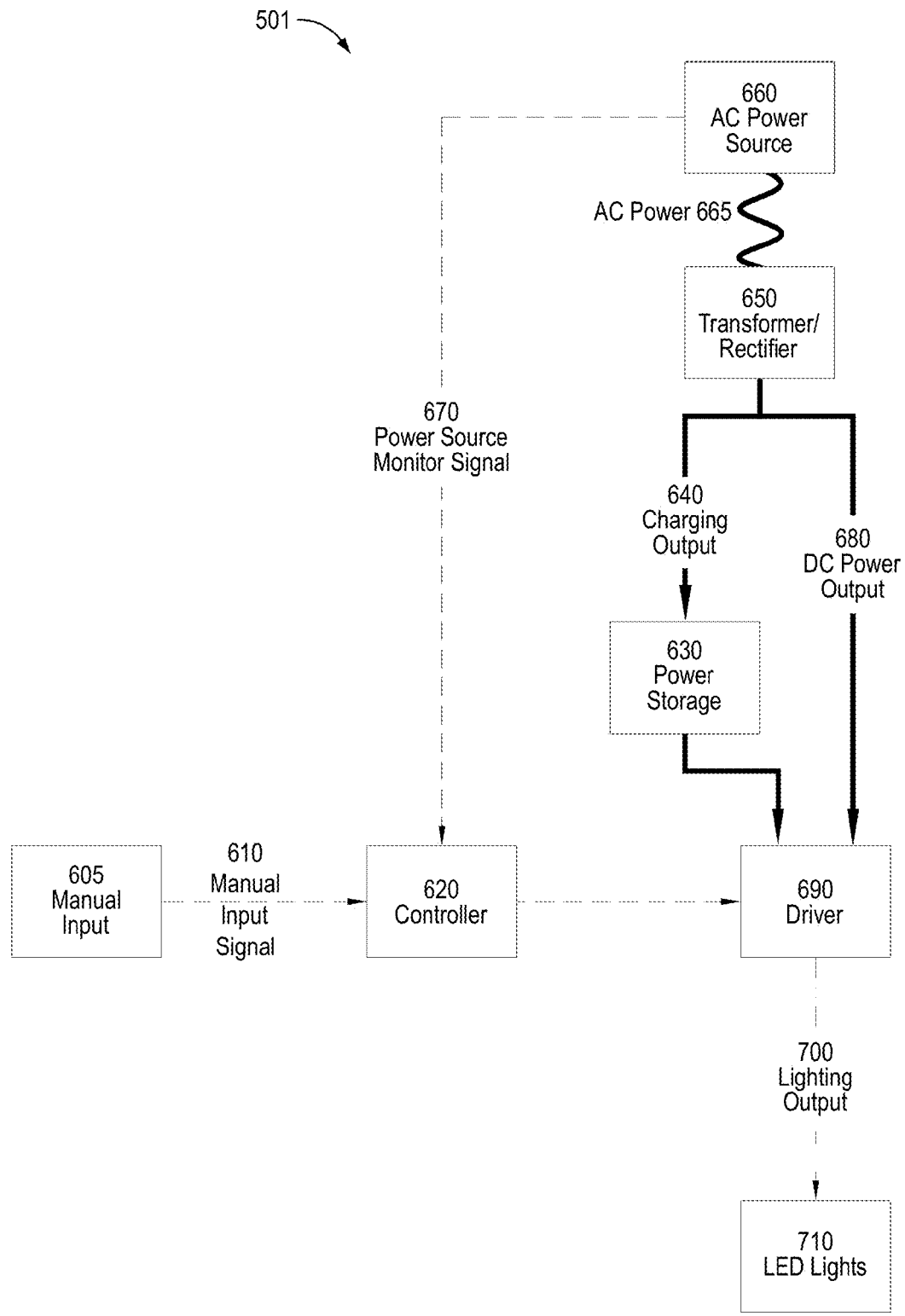
FIGS. 5-8 illustrate the functional components of embodiments according to aspects of the invention.

Block diagram 501 of FIG. 5 illustrates the functional components of this embodiment. A manual input such as a switch 605 provides manual input signal 610 to controller 620. Controller 620 monitors the AC power source (see 670). Driver 690 provides current 700 to drive LED lights 710. The AC power source (line power) 660 provides AC current 665 to transformer/rectifier 650. Transformer/rectifier 650 provides DC charging output 640 to power storage 630. Transformer/rectifier 650 also provides DC operating current 680 to driver 690.

Figure 9:
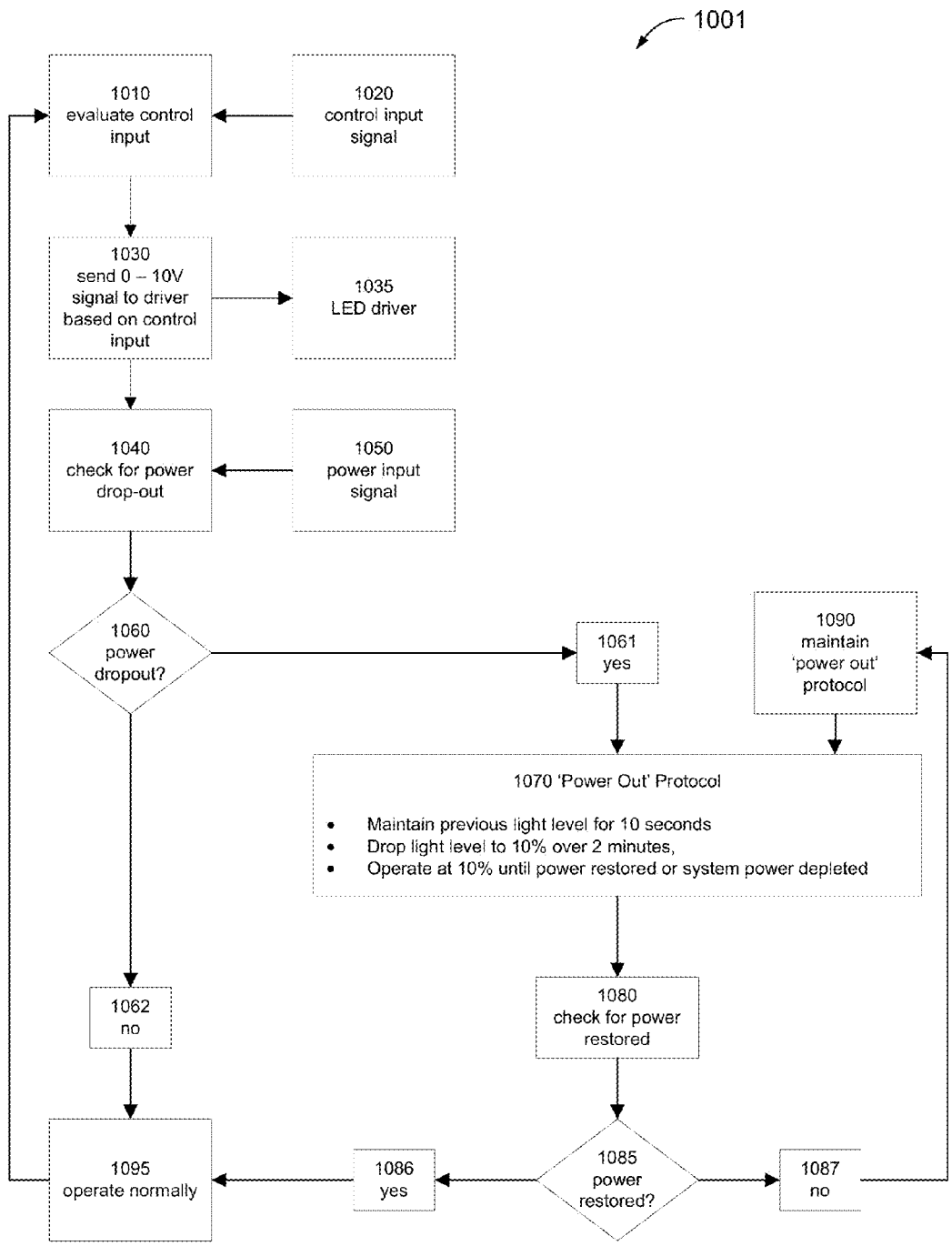
FIG. 9 is a flow chart of a method according to aspects of the invention.

Block diagram 1001 of FIG. 9 illustrates the programming with regard to power monitoring and 'power out' operation for controller 620, FIG. 5. Controllers described in other embodiments would operate similarly. Control input 1020, FIG. 9 (=manual input 605, FIG. 5) is evaluated by controller, 1010. Based on the signal from the control input, the controller 1930 sends a signal between 0 and 10 volts to the driver 1035 (=driver 690, FIG. 5). The controller periodically checks, 1040, for a power drop-out signal 1050 (=670, FIG. 5) and evaluates, 1060 if power has dropped out. If 'no,' 1062, operation is normal, 1095 and the control cycle begins again at 1010. If 'yes,' 1061, the 'power out' protocol 1070 is implemented. This protocol can be as desired, and could be variable with inputs from the operator, or could be programmed into the controller memory. For example, the program could be designed to maintain existing light levels for 10 seconds, gradually drop light level to 10% over a period of 2 minutes, and operated at 10% until power is restored or system power is depleted. Once the 'power out' protocol 1070 is implemented, the controller checks 1080, and evaluates, 1085, if power is restored. If 'no,' 1087, the controller maintains 1090 power out protocol 1070. If 'yes' 1086, controller returns to normal operation 1095.

Note that the components used in the embodiments are well known in the industry, and may be selected from many models for size, capacity, price, performance, reliability, etc.

Some exemplary components that would be suitable are listed below. For example, controller 620, FIG. 5, which could be adapted through software or minor hardware modification to include the functions described herein, has been described in detail in U.S. Ser. No. 13/248,859 filed Sep. 29, 2011 and incorporated by reference herein. An exemplary transformer/rectifier (also applicable to 720 and 650, FIG. 6) is the BPI 400 Industrial Power Supply Module available from BIAS Power, 1368 Busch Parkway Buffalo Grove, Ill. 60089. LED driver 690 can be the 100W TRC-100DS available from 'Thomas Research, 11548 Smith Drive, Huntley, Ill. 60142. The battery ('power storage' 630) could be any of thousands of commercial models, including the previously described ST27DC180. LED lights 710 could be the units described in U.S. Ser. No. 12/751,519 filed Mar. 31, 2010, and published as U.S. 2010/0195326 (now U.S. Pat. No. 8,449,144) and incorporated by reference herein, or could be any other fixture using multiple LEDs.

D. Second Exemplary Embodiment: Lighting System Integrated with Commercial UPS A second apparatus, system, and method for solid state lighting is envisioned which according to aspects of the invention provides primary event and/or utility lighting for sports or other large area lighting needs during normal power conditions, and which, during periods of interrupted power or under other desired circumstances, using existing event or utility lighting fixtures, provides functionally uninterrupted event lighting, which is transitioned to successively lower levels.

Functionally, the lighting system would operated at a given power level for normal event lighting using grid power which is provided through a commercially available UPS. In the event of power interruption to the UPS, it would continue to provide the equivalent of grid power to the lighting system. However, the lighting system would initiate a backup response strategy similar to the previous embodiment which would tend to maximize the backup power available from the UPS while still providing "backup event lighting" followed by backup utility lighting and emergency lighting. Optionally, power from the UPS could be supplemented by batteries, capacitors, or other source of emergency power in accordance with the previous embodiment.

In the event of power interruption, a signal from the UPS or from a separate power monitoring function or circuit would signal the lighting system to begin a backup response in accordance with the previous embodiment.

Figure 3:
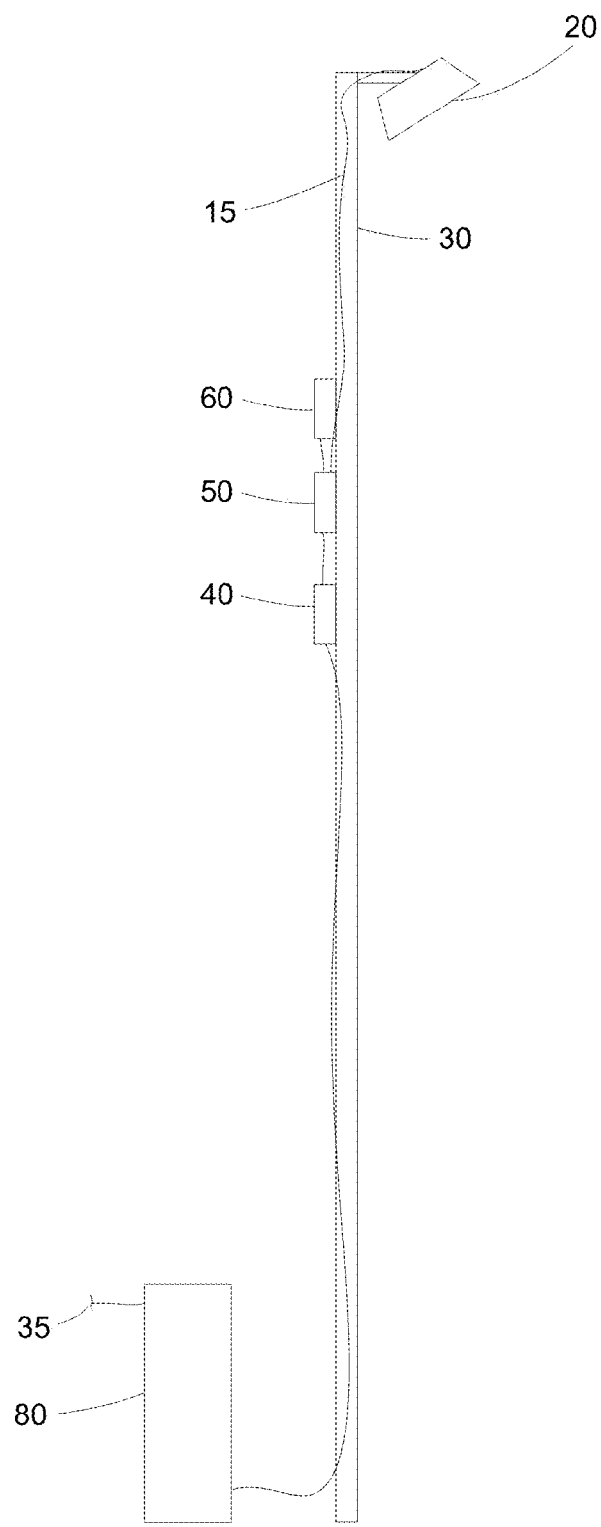

FIG. 3 illustrates the apparatus according the second embodiment. AC power 35 is input to the UPS 80. UPS 80 supplies power to transformer/rectifier 40 which supplies DC current to driver 50. In the event of a power interruption, UPS 80 continues to supply power to transformer/rectifier 40. Output from driver 50 continues to supply LED array 20 but is modified according to instructions from controller 60.

A commercial UPS as utilized in this embodiment includes battery storage and UPS circuitry which provides double conversion protection. Block diagram 401 of FIG. 4 illustrates logical operation of the envisioned second embodiment which is functionally similar to the first embodiment; however in the case of the second embodiment, power to the LED driver is provided through the UPS, so event lighting 480 is provided by the grid through the UPS.

Figure 6:
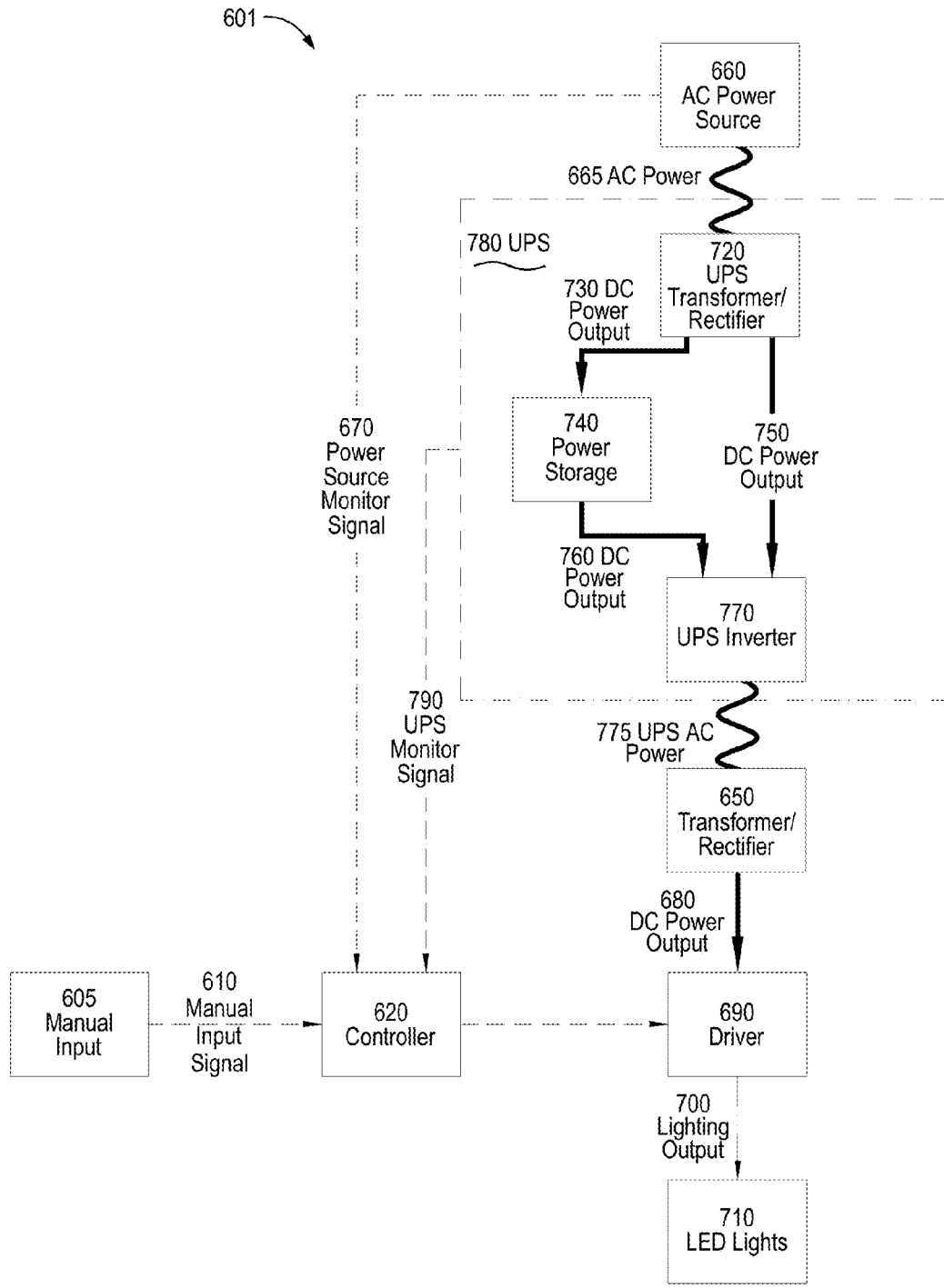

The block diagram 601 of FIG. 6 illustrates the functional components of this embodiment. A manual input such as a switch 605 is connected to and sends signal 610 to controller 620. Controller 620 monitors the AC power source 660 (via power source monitor signal 670) and the status of the commercial UPS 780 (via UPS monitor signal 790). Driver 690 provides a variable voltage or current 700 to drive LED lights 710. The AC power source (line power) 660 provides AC current to UPS transformer/rectifier 720. Transformer/rectifier 720 provides DC charging output 730 to power storage 740. Power storage 740 can then provide 760 DC power output instead. Transformer/rectifier 720 also provides DC operating current 750 to UPS inverter 770. UPS inverter 770 provides AC power 775 to transformer/rectifier 650.

While a commercial UPS typically provides AC current emulating grid power, UPS units are available which provide DC output instead. This DC power could be provided directly to the LED driver circuit. In this case, an AC transformer/rectifier 650 would not be needed in the LED driver circuit.

Benefits of this embodiment could include the ability to retrofit to an existing UPS backup system, while enhancing emergency lighting management capabilities. This could allow the ability to move from full backup event lighting to backup utility lighting to emergency lighting using same physical lighting components. This could further significantly extend duration of emergency lighting during a power interruption, eliminate or reduce need for separate emergency lights, and provide extra functionality for extended use of facilities during extended power interruption.

Some exemplary components that would be suitable in this embodiment, in addition to the components listed previously herein, are listed below. An examplary UPS inverter 770, FIG. 6, is the UltraLITE Model ELU Centralized Emergency Lighting Inverter, available from Controlled Power Company, 1955 Stephenson Highway, Troy, Mich. 48083.

E. Third Exemplary Embodiment

Figure 7:
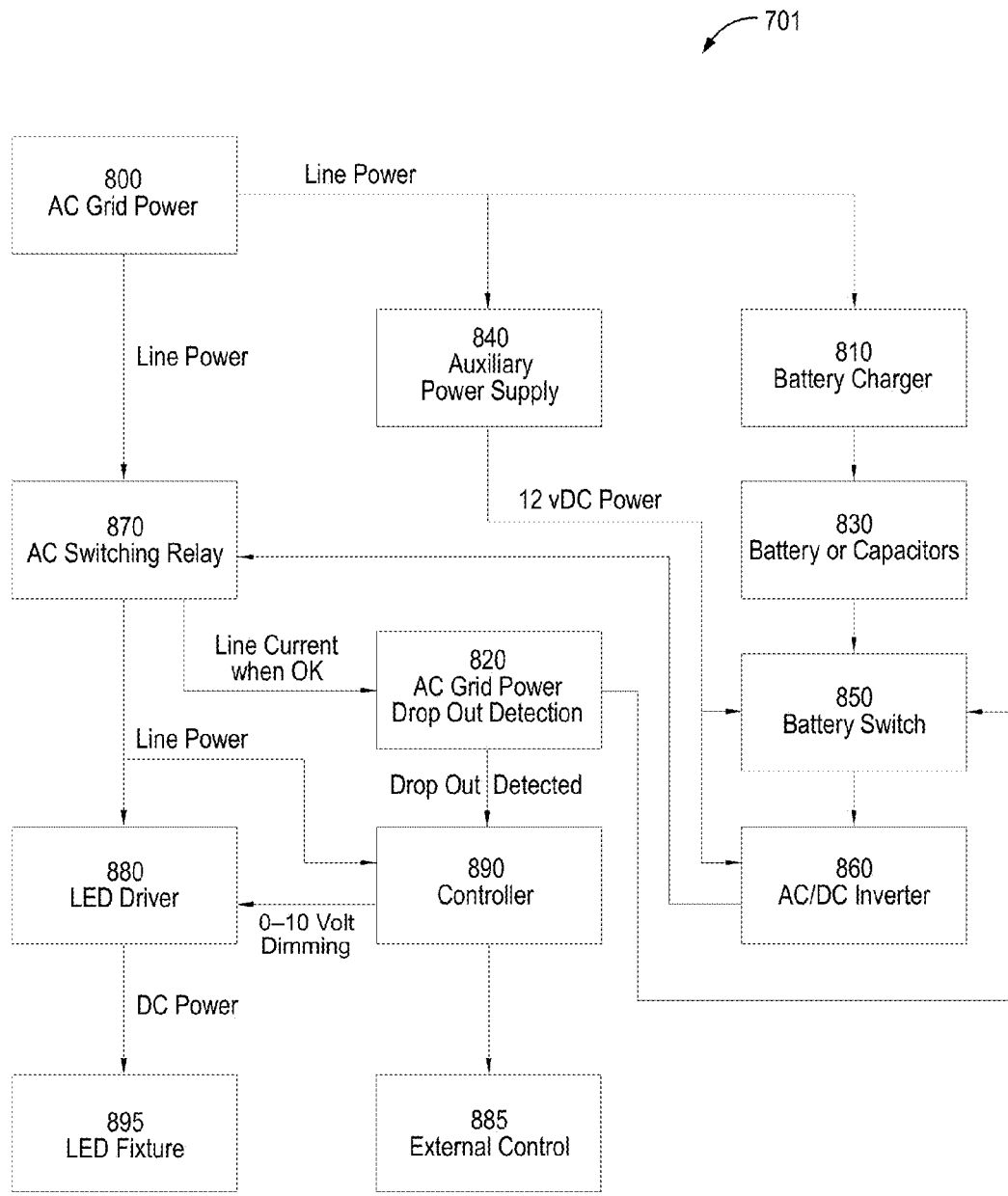

A third optional embodiment is shown in the block diagram 701 of FIG. 7. During normal operation, grid power 800 is provided to LED driver 880 through AC switching relay 870. The LED driver 880 provides current to operate LED fixture 895. LED controller 890 provides a variable 0-10 VDC control signal to LED driver 880. External control inputs 885 may be provided to vary LED brightness by signaling the LED controller 890.

If a power outage occurs, power switch 870 switches the AC power source for LED driver 880 from grid power 800 to inverter 860. Drop out detection function 820 monitors grid power at AC switch 870. If a power outage occurs, the drop out detection function signals LED controller 890 to operated under a 'power down' mode which begins to dim lights according to a pre-programmed schedule. Power detection function 820 also signals battery switch 850 to connect DC power from battery 830 to inverter 860.

Inverter 860 is kept 'on' and 'idle' by power from DC power supply 840. This allows the inverter to provide AC power to AC switch 870 more quickly than if it were powered down and required a cold start from battery power in the event of power outage.

Battery 830 is kept charged by battery charger 810 which is powered by AC power grid 800.

Some exemplary components that would be suitable in this embodiment, have been listed previously. An exemplary switching relay 870, FIG. 7, is the KRP-14AN-120-ND available from Tyco Electronics Corporation, 1050 Westlakes Drive, Berwyn, Pa. 19312.

F. Fourth Exemplary Embodiment

Figure 8:
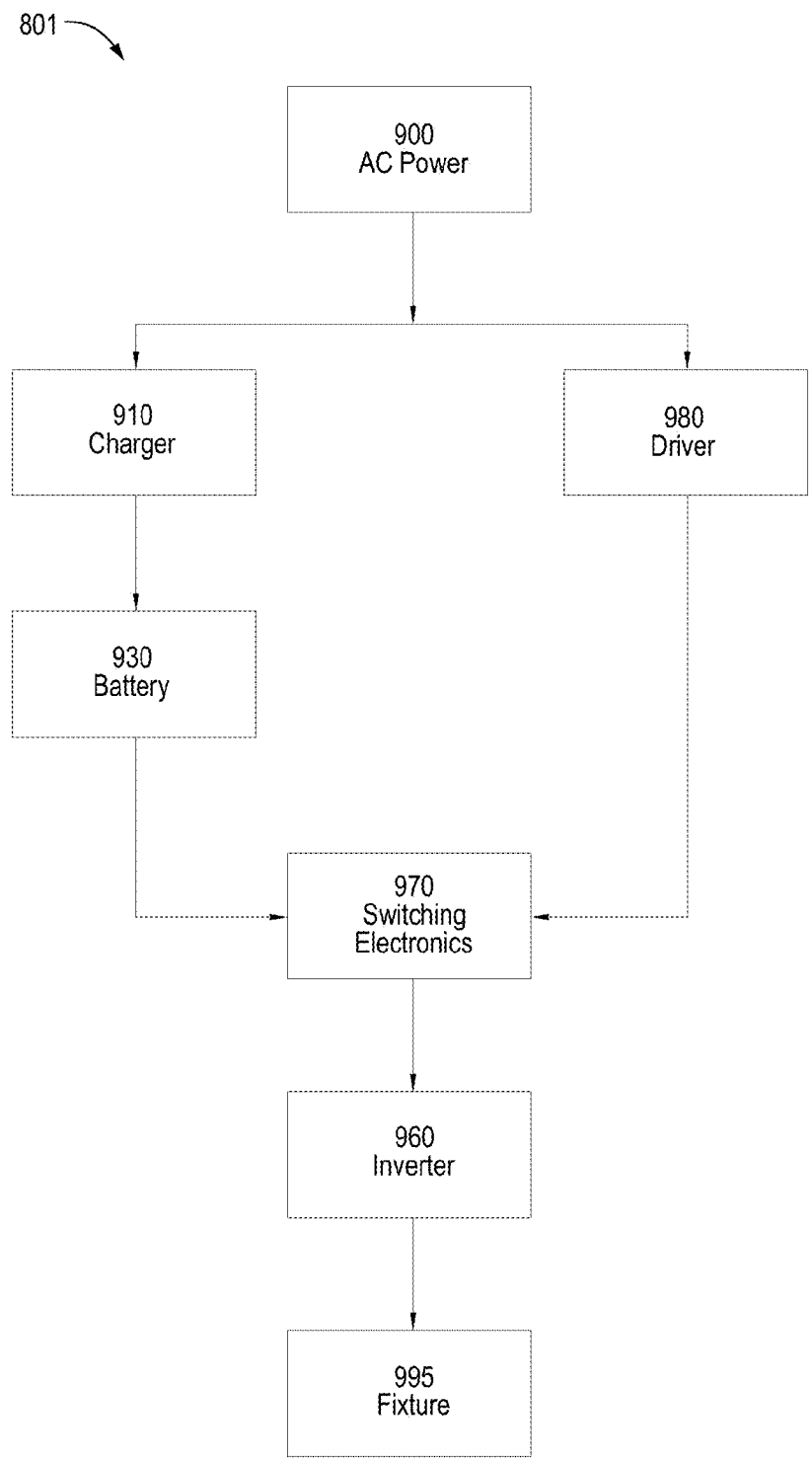

A fourth optional embodiment is shown in block diagram 801 of FIG. 8. In FIG. 8, fixture 995 receives power from inverter 960. Inverter 960 receives power from switching electronics unit 970, which receives power from driver 980, if AC power 900 is uninterrupted, or from battery 930 if AC power is interrupted. AC power 900 is provided to charger 910 which charges battery 930.

Some exemplary components that would be suitable in this embodiment have been listed previously.

G. Options and Alternatives

As can be appreciated by those skilled in the art, the invention can take many forms and embodiments. Variations obvious to those skilled in the art will be included herein. Additional options and alternatives according to aspects of the invention are many and varied. Some options/alternatives include:

a. using both batteries and capacitors to provide the benefits of both types of technology, or other power supplies such as emergency generators, including very low powered generators in conjunction with intentionally dimmed output.

b. LED/solid state lights could be simultaneously dimmed, or individual groups of LEDs could be shut off, or both strategies could be followed, allowing control of different light levels at different locations in a playing field, stadium, etc.

c. An alarm function or 'flash' circuit could be provided. Different colors or different flash intervals could be used to indicate system status. If different colored LEDs are used, they could be part of a visual alarm system—e.g. flashing red LEDs only intermittently. This alarm or flash circuit could be used e.g. to indicate that a power outage was in effect, that lights would be dimming, or that lights were nearly out of power. Different colors or flash sequences, etc. might be used to indicate different conditions.

d. In the event of a power interruption, the backup circuit could startup immediately without warning, or lights could "flicker" or "flash" (i.e. either drop visual lighting levels, increase lighting levels, or both).

e. The system could be used in conjunction with a light sensor in the fixture that measures ambient light. Light output could be coordinated with available light in order to maintain at least a minimum light level, while providing for maximum battery life under emergency conditions. In this instance, a desired total lumen value could be specified, and the control program would compare available light to light output in order to provide the desired light level.

f. An additional method to conserve battery life could be implement a control program having a 'special mode' on the driver that provides a pulse-width modulated (PWM) output at around 100 hz, which would be above the flicker point, but would have a duty cycle low enough to conserve battery life.

g. The system could report status (such as e.g. 'event', 'utility', or 'emergency' lighting modes, as well as fault detection and battery status variables) back to a centralized control system. An example of a centralized control system would be CONTROL LINK™ by Musco Corporation, which uses the wireless internet to communicate from a central server to widely distributed controllers associated with lighting systems in different locations across the country, or even the world. Details of such a system can be found at U.S. Pat. Nos. 6,681,110 and 7,778,635, which are incorporated by reference herein.

h. Battery charging could be done by using solar chargers, possibly saving significant cost vs. some types of battery charging systems.

i. The individual components listed as parts of embodiments according to aspects of the invention are well known in the industry. Many have been previously listed herein. Any components not specifically listed would be available as a standard or custom product from many different suppliers and might be located through an internet search or a component supplier such as Digi-Key Corporation, 701 Brooks Avenue South, Thief River Falls, Minn. 56701; McMaster-Carr, 200 New Canton Way, Robbinsville, N.J. 08691; Allied Electronics, Inc., 7151 Jack Newell Blvd. S., Fort Worth, Tex. 76118, or many other similar suppliers.

The foregoing description is by way of example and not limitation. It is neither exclusive or inclusive of all forms and embodiments the invention can take. Variations obvious to those skilled in the art are included in the invention, which is defined by the appended claims.

What is claimed is:

1. A method of large area lighting for a lighting application comprising:
 a. providing illumination from an electrically-powered lighting system at:
  i. event lighting level; or
  ii. utility lighting level;
 b. upon a power interruption to the lighting system providing:
  i. uninterrupted event or utility lighting for a relatively short duration; and
  ii. a gradual transition from event or utility lighting to an emergency lighting level;
  iii. wherein the gradual transition comprises either a stepless or a step-wise change in lighting levels.

2. The method of claim 1 further comprising a gradual transition from emergency lighting level to a lower than emergency lighting level.

3. The method of claim 2 further comprising a gradual transition from the lower than emergency lighting level to shut down according to a schedule or timeline.

4. The method of claim 1 wherein the large area lighting comprises sports, stadium, arena, or other large venues for the public.

5. The method of claim 1 wherein the lighting system comprises:
 a. high intensity discharge light sources; and/or
 b. solid state light sources.

6. The method of claim 1 wherein power interruption is automatically sensed.

7. The method of claim 1 wherein the relatively short duration is determined by one or more factors including but not limited to:
 a. available power supply.

8. The method of claim 7 wherein the available power supply comprises a battery supply and a DC to AC converter.

9. The method of claim 1 wherein the gradual transition is determined by one or more factors including but not limited to:
 a. available power supply.

10. The method of claim 1 further comprising a gradual transition between event lighting level to utility lighting level before gradual transition to emergency lighting level if the lighting system is at event lighting level at the time of power interruption.

11. A system for providing large area lighting for a lighting application comprising:

a. a plurality of high intensity light fixtures adapted to provide event or utility lighting levels;
b. a power and control circuit to the fixtures in communication with an AC electrical power source;
c. a sensor for sensing interruption of the AC electrical power source to the power and control circuit;
d. a back up source of electrical power;
e. a sub-system including a controller configured to;
   i. automatically change-over to the back up source of electrical power upon the sensing of interruption of the AC electrical power source;
   ii. automatically control operation of the power and control circuit of the fixtures to provide:
      1. uninterrupted event or utility lighting for a relatively short duration;
      2. a gradual transition from event or utility lighting to a wherein the gradual transition from event or utility to a lower level comprises gradually reducing lighting levels followed by shut down of the light fixtures and automatic turn on of separate emergency light level lighting fixtures.

12. The system of claim 11 wherein the back up source comprises:
   a. a back up battery system;
   b. an emergency generator system.

13. The system of claim 11 wherein the wherein the gradual transition from event or utility to a lower level comprises control of the said lighting fixtures to emergency light level.

14. The system of claim 11 further comprising discretionary control the lighting fixtures for a gradual transition between any of event, utility, emergency, or shut down light levels for reasons apart from sensing of power interruption.

15. A method of automatically controlling a wide or large area lighting system for such events as sports contests, automobile racing, or public shows comprising:
   a. providing sufficient electrical power from the public electrical power grid to provide illumination at:
      i. event lighting level; or
      ii. utility lighting level;
   b. upon sensing an interruption of grid power to the lighting system providing from an alternative power source:
      i. uninterrupted event or utility lighting for a relatively short duration; and
      ii. a gradual transition from event or utility lighting to an emergency
      iii. wherein status of the lighting system is communicated to a remote monitoring system and the remote monitoring system provides control signals to the lighting system to influence or control the transition from event or utility lighting to an emergency lighting level or to lighting levels as desired.

16. The method of claim 15 wherein the relatively short duration is determined by capacity of the alternative power source and nature of the contest, racing, or show.

17. The method of claim 16 wherein the nature of the contest, racing, or show comprises a reasonable length of time:
   a. to complete a play in a sporting contest;
   b. to slow a racing car down to caution or yellow flag track condition; or
   c. for human eyes to adapt to a difference between event lighting level and a lower level.

* * * * *

UNITED STATES PATENT AND TRADEMARK OFFICE
CERTIFICATE OF CORRECTION

PATENT NO. : 8,946,991 B2
APPLICATION NO. : 13/330799
DATED : February 3, 2015
INVENTOR(S) : Gordin Page 1 of 1

It is certified that error appears in the above-identified patent and that said Letters Patent is hereby corrected as shown below:

In the Claims

<u>Col. 13, Claim 11, line 17</u>:
ADD --,-- after "lower level"

<u>Col. 13, Claim 12, line 24</u>:
ADD after system; --or--

<u>Col. 14, Claim 15, line 13</u>:
ADD after emergency --level;--

Signed and Sealed this
Ninth Day of June, 2015

Michelle K. Lee
*Director of the United States Patent and Trademark Office*